US007636618B2

(12) United States Patent
Cordova et al.

(10) Patent No.: US 7,636,618 B2
(45) Date of Patent: Dec. 22, 2009

(54) RESPONDING TO AIRCRAFT EXCURSIONS FROM FLIGHT ENVELOPES

(75) Inventors: Mario D. Cordova, Cerritos, CA (US); Harry W. Slusher, Fountain Valley, CA (US)

(73) Assignee: The Boeing Company, Chicago, IL (US)

( * ) Notice: Subject to any disclaimer, the term of this patent is extended or adjusted under 35 U.S.C. 154(b) by 490 days.

(21) Appl. No.: 11/521,227

(22) Filed: Sep. 14, 2006

(65) Prior Publication Data

US 2009/0292409 A1 Nov. 26, 2009

(51) Int. Cl.
*B64D 43/02* (2006.01)
*G06F 19/00* (2006.01)

(52) U.S. Cl. ................. 701/9; 701/4; 701/35; 340/945; 340/969

(58) Field of Classification Search ..................... 701/9, 701/3, 4, 7, 8, 29, 35; 340/945, 967, 969, 340/973, 978

See application file for complete search history.

(56) References Cited

U.S. PATENT DOCUMENTS 5,359,326 A * 10/1994 Bivens et al. ............... 340/971
5,511,430 A * 4/1996 Delest et al. .................. 73/802
5,912,627 A * 6/1999 Alexander ............... 340/815.4
6,643,580 B1 * 11/2003 Naimer et al. .............. 701/206
6,676,075 B2 1/2004 Cowan et al.
7,164,366 B2 * 1/2007 Delaplace et al. ........... 340/945
7,382,283 B2 * 6/2008 Delaplace et al. ........... 340/945
2002/0055809 A1 5/2002 Westphal
2006/0085102 A1 * 4/2006 Doel et al. ..................... 701/14

FOREIGN PATENT DOCUMENTS

EP 0952446 A 10/1999
EP 1455313 A 9/2004
WO WO 02/08057 A 1/2002

OTHER PUBLICATIONS

Shaneyfelt W: "The Helicopter Pilot's Emergency Situation Advisor", Scientific Honeyweller, Honeywell's Corporate; Minneapolis, US; vol. 9, No. 1, Jun. 21, 1998; pp. 43-49, XP000128049; ISSN: 0196-8440.

* cited by examiner

*Primary Examiner*—Tan Q Nguyen
(74) *Attorney, Agent, or Firm*—Harness, Dickey & Pierce, P.L.C.

(57) ABSTRACT

A method of monitoring an aircraft during use. Flight parameters of the aircraft are monitored to detect an excursion from a flight envelope. While the aircraft is still in flight, the monitored flight parameters are used to determine the severity of a detected excursion, aircraft component(s) possibly affected by the excursion are identified, and flight restrictions and/or inspections responsive to the excursion severity and identified component(s) are specified. This method provides valuable information to a flight crew about flight envelope excursions, can enhance passenger safety and can prevent unnecessary inspections and aircraft downtime.

20 Claims, 1 Drawing Sheet

RESPONDING TO AIRCRAFT EXCURSIONS FROM FLIGHT ENVELOPES

FIELD

The present disclosure relates generally to monitoring aircraft during use and more particularly to identifying and responding to excursions of aircraft from predefined flight envelopes.

BACKGROUND

The statements in this section merely provide background information related to the present disclosure and may not constitute prior art.

Aircraft are occasionally subjected to high loads due, for example, to evasive maneuvers, pull-up from a gust-induced dive, and/or over-speed. If such a load were to exceed the yield strength of an aircraft structure, damage could result to the aircraft. Typically a pilot reports a flight envelope excursion such as overload or over-speed based on his/her own observation and personal evaluation of the excursion. More precise data describing an overload and/or over-speed event, however, typically is not available to the pilot. Although excursion data may be recorded in an aircraft flight data recorder, it usually is not retrieved, because retrieval of flight recorder data is typically time consuming.

SUMMARY

The present disclosure, in one implementation, is directed to a method of monitoring an aircraft during use. A plurality of flight parameters of the aircraft are monitored. The method includes detecting an excursion of the aircraft from a flight envelope predefined for at least one of the monitored flight parameters. While the aircraft is still in flight, the monitored flight parameters are used to determine a severity of the detected excursion. One or more components of the aircraft possibly affected by the excursion are identified, and one or more ways of handling the aircraft responsive to the excursion severity and the one or more possibly affected components are specified.

In another implementation, the disclosure is directed to a method of monitoring an aircraft during use. The method includes detecting a speed of the aircraft in excess of a predefined speed limit. Upon detecting the excess speed, a plurality of flight parameters, including the detected excess speed, of the aircraft are recorded. While the aircraft is still in flight after the excess speed is detected, one or more components of the aircraft possibly affected as a result of the excess speed are identified. The identifying is performed using the recorded flight parameters. Based on the identifying, an inspection plan is specified for the identified components.

In yet another implementation, the disclosure is directed to a system for monitoring an aircraft during use. The system includes a processor and memory configured to monitor a plurality of flight parameters of the aircraft and detect an excursion of one or more of the monitored flight parameters from a flight envelope predefined for one or more of the monitored flight parameters. While the aircraft is still in use after the excursion, one or more of the monitored flight parameters are analyzed to determine a severity of the excursion and to identify one or more components of the aircraft possibly affected by the excursion. The processor and memory are configured to specify one or more flight restrictions based on the excursion severity and identified components.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION OF THE PREFERRED EMBODIMENTS

The following description is merely exemplary in nature and is not intended to limit the present disclosure, application, or uses.

In some implementations of the present disclosure, real-time information from various systems of an aircraft is used to detect an excursion by the aircraft from a flight envelope and to evaluate the severity of such excursion. An alert or warning may be displayed immediately to the aircraft flight crew upon detection of the excursion. In some implementations, a warning may also be displayed to the flight crew that specifies flight restrictions to be complied with for the remainder of the flight, e.g., load factor restrictions, speed restrictions, etc. An inspection plan may also be issued for the aircraft, along with a notification to the flight crew that maintenance is to be performed on the aircraft prior to a subsequent flight of the aircraft.

Figure 1:
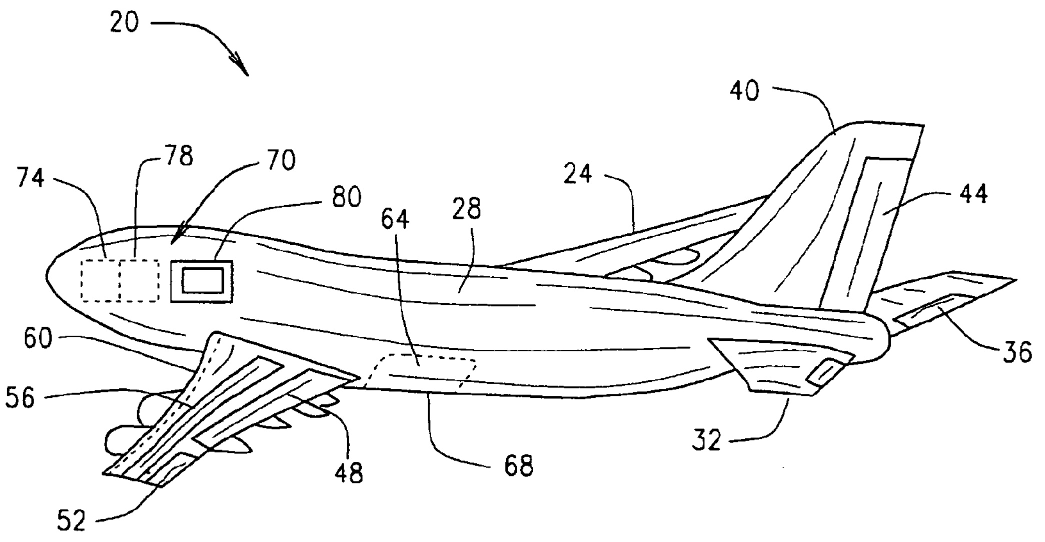
FIG. 1 is a perspective view of an aircraft including a monitoring system in accordance with one implementation of the disclosure.

An aircraft including a monitoring system in accordance with one implementation of the disclosure is indicated generally in FIG. 1 by reference number 20. As very well known in the art, the aircraft 20 includes wings 24, a fuselage 28, a horizontal tail 32 having elevators 36, and a vertical tail 40 having a rudder 44. Wings 24 include flaps 48, ailerons 52, spoilers 56, and slats 60. The aircraft 20 has landing gear 64 stowed above gear doors 68.

In the present exemplary implementation of the disclosure, a monitoring system for the aircraft 20 is indicated generally by reference number 70. The system 70 includes a processor 74 and memory 78. The processor 74 and memory 78 may be, for example, in a mission computer of the aircraft 20 which also includes a cockpit display 80. It should be noted, however, that other or additional processors, computers and/or the like could be used. Additionally or alternatively, implementations are possible in which more than one computer could be used, including but not limited to a ground computer in communication with the aircraft 20. It shall be appreciated by those skilled in the art that many different configurations of processor(s), memory(s), computer(s), microprocessor(s), microcomputer(s), etc. could be used in implementing the disclosure.

The processor 74 receives and/or determines information pertaining to various components of the aircraft 20, e.g., using signals from various sensing devices (not shown) of the aircraft 20. Such information includes but is not necessarily limited to a plurality of flight parameters monitored by the system 70 during use of the aircraft 20. In the present exemplary implementation, monitored flight parameters include gross weight, fuel weight, payload weight, center of gravity, reverse thrust setting, flap deflection, aileron deflection, elevator deflection, rudder deflection, spoiler deflection, slat position, landing gear position, vertical load factor, pitch angle, pitch rate, pitch acceleration, roll position, roll rate, roll acceleration, flight speed, Mach number, dynamic pressure, pressure altitude, and landing impact sink speed. In various implementations, additional, fewer and/or different flight parameters could be monitored and/or analyzed.

Figure 2:
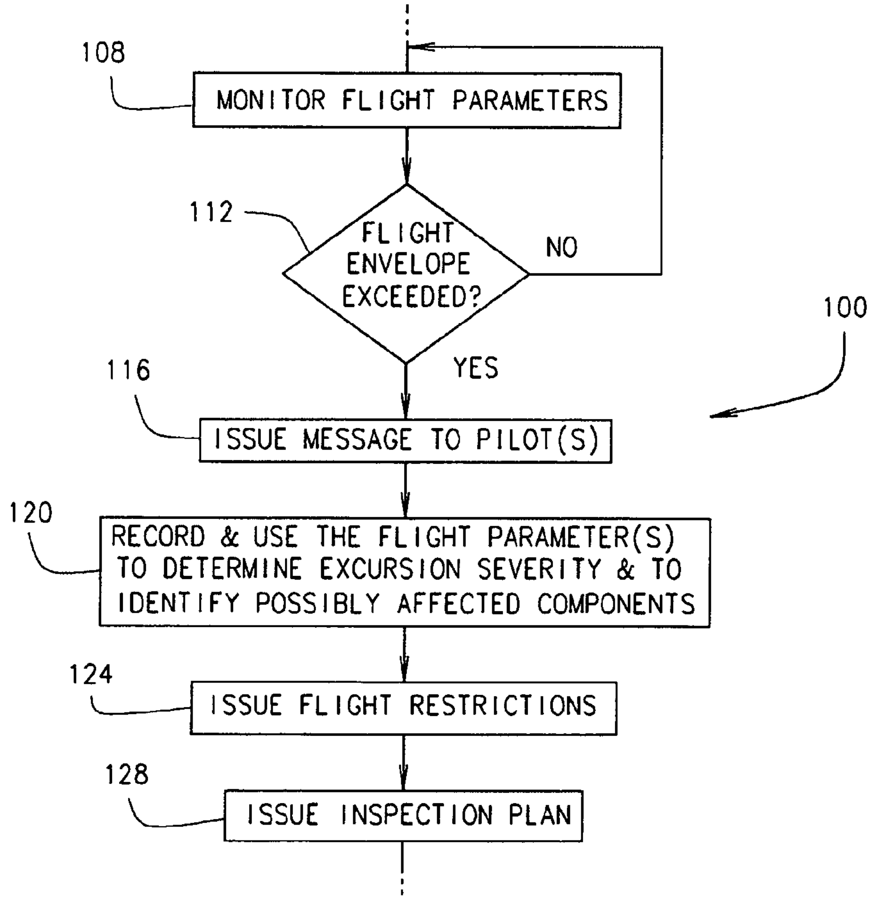
FIG. 2 is a flow diagram of a method of monitoring an aircraft in accordance with one implementation of the disclosure.

A flow diagram of one implementation of a method of monitoring an aircraft is indicated generally in FIG. 2 by reference number 100. In operation 108, the foregoing flight parameters of the aircraft 20 are monitored. The monitoring is performed by the system 70 at least in part to detect any excursion(s) of the aircraft 20 from a flight envelope predefined for at least one of the monitored flight parameters. In the present example, the flight envelope is predefined for simultaneously. Where operation 120 is performed before operation 116, a message may be issued to the flight crew that includes information about the excursion obtained in operation 120. In operation 124, the system 70 uses information obtained in operation 120 to determine whether any flight restrictions should be issued for the remainder of the flight, and issues the restrictions (if any) to the flight crew. In operation 128 the system 70 issues an inspection plan to be performed, e.g., before the next flight of the aircraft 20, to determine whether any damage occurred as a result of the excursion. The system 70 may analyze a flight parameter at least in part by comparing the recorded value for the flight parameter to a predefined limit and/or range. A monitored flight parameter may be associated with one or more components of the aircraft 20, and/or a component of the aircraft 20 may be associated with one or more flight parameters, e.g., as shown in Table 1.

TABLE 1

| | Aircraft Component | | | | | | | | | | |
|---|---|---|---|---|---|---|---|---|---|---|---|
| Flight Parameter | Wing | Fuselage | Horizontal Tail | Flap | Aileron | Elevator | Rudder | Spoiler | Slats | Gear Doors | Landing Gear |
| Gross Weight | X | X | X | | | | | | | | X |
| Fuel Weight | X | | | | | | | | | | X |
| Payload Weight | | X | | | | | | | | | |
| Center of Gravity | | X | X | | | | | | | | |
| Reverse Thrust Setting | X | | | | | | | | | | |
| Flap Deflection | X | | X | X | | | | | | | |
| Aileron Deflection | | | | | X | | | | | | |
| Elevator Deflection | | | | | | X | | | | | |
| Rudder Deflection | | | | | | | X | | | | |
| Spoiler Deflection | | | | | | | | X | | | |
| Slat Position | | | | | | | | | X | | |
| Landing Gear Position | | | | | | | | | | X | |
| Vertical Load Factor | X | X | X | | | | | | | | X |
| Pitch Position | | X | | | | | | | | | X |
| Pitch Rate | | X | | | | | | | | | X |
| Pitch Acceleration | | X | X | | | | | | | | X |
| Roll Position | X | | | | | | | | | | X |
| Roll Rate | X | | | | | | | | | | X |
| Roll Acceleration | X | | | | | | | | | | X |
| Flight Speed | X | X | X | X | X | X | X | X | X | X | |
| Mach Number | X | X | X | X | X | X | X | X | X | X | |
| Dynamic Pressure | X | X | X | X | X | X | X | X | X | X | |
| Pressure Altitude | | | | | | | | | | X | |
| Landing Impact Sink Speed | X | X | | | | | | | | | X |

flight speed and vertical load factor. In various other implementations, a flight envelope could be for flight speed only, load factor only, or for flight speed in combination with vertical load factor and/or landing impact sink speed. In still other implementations, other or additional flight parameters could be included in a flight envelope.

In the present example and referring to FIGS. 1 and 2, if in operation 112 the system 70 detects an excursion of flight speed and/or vertical load factor from the predefined flight envelope, then in operation 116 the system 70 issues a warning message to the flight crew of the aircraft 20. The message could be, e.g., displayed on the cockpit display 80. In operation 120, the system 70 records and uses the flight parameter(s) for which the excursion was detected, and also may use other(s) of the monitored flight parameters, to determine a severity of the excursion and to identify one or more components of the aircraft 20 possibly affected by the excursion. Operations 116 and 120 may be performed in reverse order or Various flight parameters could be used in various ways relative to various aircraft components to identify any component(s) possibly affected by an excursion. If, e.g., in the present implementation the system 70 detects an excursion of flight speed from the predefined envelope, then for a given component possibly affected by excess flight speed, the system 70 may compare the recorded excess speed to a speed limit and/or range within which the given component is assumed to be operable without incurring speed-related damage. If the excursion speed exceeds such limit and/or range, then the given component may be identified as one for which an inspection plan is specified. Further, for the same given component, other flight parameters may be analyzed in combination with the excess flight speed. For example, as shown in Table 1, if the given component is a wing 24, then gross weight, fuel weight, reverse thrust setting, flap deflection, vertical load factor, roll position, roll rate, roll acceleration, Mach number, dynamic pressure and/or landing impact sink speed may also be analyzed in combination with the excess speed to determine whether, and if so, how, to specify an inspection plan for the wing.

Flight speed limits and/or ranges for each component possibly affected by excess flight speed may be compared in the same or similar manner to the excess flight speed. Thus, for example, as shown in Table 1, in response to a flight speed excursion the system 70 may analyze the excess flight speed relative to all of the components in Table 1 except landing gear 64.

In another example, the system 70 may detect an excursion in vertical load factor beyond a predefined limit. In such event, for a given component possibly affected by excess vertical load factor, the system 70 may compare the recorded excess vertical load factor to a limit for the given component. For example, as shown in Table 1, if the given component is a wing 24, then gross weight, fuel weight, roll rate and other recorded parameters may also be analyzed in combination with the excess vertical load factor to determine whether, and if so, how, to specify flight restriction(s) for the aircraft 20 and/or specify an inspection plan for the wing 24. The analysis of the vertical load factor, in combination with the other pertinent parameters recorded at essentially the same instant, may indicate that certain areas of the wing need a detailed inspection and other areas do not. The analysis could also indicate, e.g., that the aircraft should be flown below a predefined speed limit for the remainder of the flight. Alternatively, the analysis may indicate that the combination of vertical load factor and, e.g., gross weight and fuel weight did not exceed the strength limits of the wing 24, thus indicating that no flight restriction or inspection would be required.

The system 70 performs such analysis while the aircraft 20 is still in use after the excursion. Based on the analysis of the flight parameter(s) and the identified component(s) (if any) possibly affected by the excursion, the system 70 may specify one or more ways of handling the aircraft responsive to the excursion severity and the possibly affected component(s). For example, the system 70 may specify one or more flight restrictions to be observed by the flight crew while the aircraft is still in use. Such restrictions could include but are not limited to restrictions on load factor and/or speed. Additionally or alternatively, the system 70 may specify one or more inspections of the aircraft 20 to be made, e.g., after the flight has ended. Such inspection(s) may be specific to the excursion severity and specific to the identified component(s). In one implementation of the disclosure, an inspection plan is formulated to specify and describe every step a mechanic or other maintenance person would need to take to perform the inspection. Such an inspection plan may describe every subcomponent of a possibly excursion-affected component that a mechanic would encounter, and every action a mechanic would need to take, in an order necessary or appropriate for completing the actual inspection.

Various implementations of the disclosure make it possible to notify a flight crew immediately in the event of an excursion of an aircraft from its flight envelope. The flight crew also can be notified immediately as to the severity of an excursion. Additionally, passenger safety is enhanced through the issuance of flight restrictions, when appropriate, to the flight crew after an excursion. Maintenance personnel are able to access information about an excursion and could be required to perform the appropriate inspection(s) before the next flight of a possibly damaged aircraft. Thus, inspection of a damaged aircraft could be virtually assured. On the other hand, various implementations of the disclosure provide valuable information to a flight crew about flight envelope excursions and thus can prevent expensive, unnecessary inspections and aircraft downtime. Various implementations of the disclosure can virtually ensure that inspections are performed on airplanes that actually exceeded applicable load/speed limits.

What is claimed is:

1. A method of monitoring an aircraft during use, the method comprising:

monitoring a plurality of flight parameters of the aircraft;

detecting an excursion of the aircraft from a flight envelope predefined for at least one of the monitored flight parameters; and while the aircraft is still in flight:

using the monitored flight parameters to determine a severity of the detected excursion;

identifying one or more components of the aircraft possibly affected by the excursion; and based on the excursion severity and the one or more identified possibly affected components, specifying one or more flight restrictions to be observed for the remainder of the flight, and specifying one or more inspections to be made of the one or more possibly affected components of the aircraft;

said method performed by one or more processors of the aircraft.

2. The method of claim 1, wherein specifying one or more flight restrictions comprises specifying at least one of the following: a restriction on load factor, and a restriction on speed.

3. The method of claim 1, wherein the flight envelope is predefined for at least one of the following flight parameters: flight speed, and vertical load factor.

4. The method of claim 1, wherein specifying an inspection comprises describing one or more steps for performing the inspection, an order in which the steps are to be performed, and for each of the one or more identified possibly affected components, every subcomponent to be encountered in the inspection.

5. The method of claim 1, wherein using the monitored flight parameters comprises comparing one of the parameters to one or more predefined parameter limits.

6. The method of claim 1, wherein using the monitored flight parameters comprises associating one of the monitored parameters with one or more components of the aircraft.

7. The method of claim 1, wherein using the monitored flight parameters comprises associating one of the components of the aircraft with one or more of the monitored parameters.

8. The method of claim 1, further comprising providing, in the aircraft, a notification of the excursion severity.

9. A method of monitoring an aircraft during use, the method comprising:

detecting a speed of the aircraft in excess of a predefined speed limit;

upon detecting the excess speed, recording a plurality of flight parameters, including the detected excess speed, of the aircraft; and while the aircraft is still in flight after the excess speed is detected:

identifying one or more components of the aircraft possibly affected as a result of the excess speed, the identifying performed using the recorded flight parameters; and based on the identifying, specifying one or more flight restrictions to be complied with for the remainder of the flight and an inspection plan for the identified components;

said method performed by one or more processors of the aircraft.

10. The method of claim 9, wherein identifying one or more components comprises:

identifying one or more excessive forces generated as a result of the excess speed; and identifying one or more components possibly affected as a result of the one or more excess forces.

11. The method of claim 9, wherein the detected excess speed is at least part of an excursion by one or more of the recorded flight parameters from a predefined flight envelope.

12. The method of claim 11, wherein identifying one or more components of the aircraft possibly affected comprises providing a notification of a severity of the excursion.

13. The method of claim 9, wherein specifying an inspection plan for the identified components comprises providing instructions including an order in which steps of the inspection are to be performed, and for each of the one or more identified possibly affected components, every subcomponent to be encountered in the inspection.

14. The method of claim 9, further comprising comparing the recorded flight parameters to a plurality of predefined parameter limits.

15. A system for monitoring an aircraft during use, the system comprising a processor and memory configured to:

monitor a plurality of flight parameters of the aircraft;

detect an excursion of one or more of the monitored flight parameters from a flight envelope predefined for one or more of the monitored flight parameters;

while the aircraft is still in use after the excursion, analyze one or more of the monitored flight parameters to determine a severity of the excursion and to identify one or more components of the aircraft possibly affected by the excursion;

analyze the flight parameters in combination to determine whether, and if so, how, to specify one or more flight restrictions to be observed for the remainder of the flight based on the excursion severity and identified components.

16. The system of claim 15, wherein the flight envelope is predefined for one or more of the following flight parameters: flight speed, and vertical load factor.

17. The system of claim 15, wherein the processor and memory are further configured to specify one or more steps for performing an inspection of the aircraft based on the excursion severity and identified components, an order in which the one or more steps are to be performed, and for each of the one or more identified possibly affected components, every subcomponent to be encountered in the inspection.

18. The system of claim 15, wherein configured to analyze one or more of the monitored flight parameters comprises configured to compare one of the parameters to one or more predefined parameter limits.

19. The system of claim 15, wherein the processor and memory are configured to specify a flight restriction on load factor.

20. The system of claim 15, wherein the processor and memory are configured to associate one of the components of the aircraft with one or more of the monitored parameters.

* * * * *

UNITED STATES PATENT AND TRADEMARK OFFICE

CERTIFICATE OF CORRECTION

PATENT NO. : 7,636,618 B2
APPLICATION NO. : 11/521227
DATED : December 22, 2009
INVENTOR(S) : Cordova et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 589 days.

Signed and Sealed this

Ninth Day of November, 2010

David J. Kappos

*Director of the United States Patent and Trademark Office*